US012683239B2

(12) United States Patent (10) Patent No.: US 12,683,239 B2
Mostofi et al. (45) Date of Patent: Jul. 14, 2026

(54) MOTOR VEHICLE

(71) Applicant: Dr. Ing. h.c. F. Porsche Aktiengesellschaft, Stuttgart (DE)

(72) Inventors: Sascha Mostofi, Stuttgart (DE); Philipp Kellner, Renningen-Malmsheim (DE); Christopher Volkmer, Niefern-Öschelbronn (DE); Simon Frieß, Kuchen (DE)

(73) Assignee: Dr. Ing. h.c. F. Porsche Aktiengesellschaft, Stuttgart (DE)

( * ) Notice: Subject to any disclaimer, the term of this patent is extended or adjusted under 35 U.S.C. 154(b) by 592 days.

(21) Appl. No.: 18/199,429

(22) Filed: May 19, 2023

(65) Prior Publication Data

US 2023/0378598 A1 Nov. 23, 2023

(30) Foreign Application Priority Data

May 20, 2022 (DE) ..................... 10 2022 112 694.3

(51) Int. Cl.
H01M 50/367 (2021.01)
B32B 5/02 (2006.01)
(Continued)

(52) U.S. Cl.
CPC ............. H01M 50/367 (2021.01); B32B 5/02 (2013.01); B32B 5/18 (2013.01); B32B 5/245 (2013.01);
(Continued)

(58) Field of Classification Search
CPC ............. H01M 50/367; H01M 50/249; H01M 50/242; B60L 50/64; B60L 50/66
See application file for complete search history.

(56) References Cited

U.S. PATENT DOCUMENTS

2013/0059175 A1 3/2013 Engel et al.
2017/0237055 A1 8/2017 Shimizu et al.
(Continued)

FOREIGN PATENT DOCUMENTS

DE 102009046385 A1 5/2011
DE 102021125191 A1 3/2023
(Continued)

OTHER PUBLICATIONS

Office Action issued Jun. 7, 2024, by the Swedish Intellectual Property Office (PRV) in corresponding Swedish Patent Application No. 2350567-0. (5 pages).
(Continued)

*Primary Examiner* — Jonathan G Jelsma
(74) *Attorney, Agent, or Firm* — Buchanan Ingersoll & Rooney PC

(57) ABSTRACT

A motor vehicle has an electric drive unit, an electrical energy reservoir, and a degassing device. The electrical energy reservoir includes a housing having an internal space and having at least one battery cell arranged therein. The degassing device includes at least one degassing channel, which is fluidly connected to the internal space of the electrical energy reservoir and to the external environment. The at least one degassing channel is formed by channel walls defining the path of the degassing channel. The channel walls are configured such the degassing channel has a meandering path formed due to a plurality of channel deflections.

19 Claims, 2 Drawing Sheets

(51) Int. Cl.

| | |
|---|---|
| *B32B 5/18* | (2006.01) |
| *B32B 5/24* | (2006.01) |
| *B60L 50/60* | (2019.01) |
| *B60L 50/64* | (2019.01) |
| *B62D 25/20* | (2006.01) |
| *B62D 29/04* | (2006.01) |
| *H01M 50/227* | (2021.01) |
| *H01M 50/242* | (2021.01) |
| *H01M 50/249* | (2021.01) |

(52) U.S. Cl.

CPC .............. *B60L 50/64* (2019.02); *B60L 50/66* (2019.02); *B62D 25/20* (2013.01); *B62D 29/043* (2013.01); *H01M 50/227* (2021.01); *H01M 50/242* (2021.01); *H01M 50/249* (2021.01); *B32B 2250/03* (2013.01); *B32B 2250/40* (2013.01); *B32B 2260/023* (2013.01); *B32B 2260/046* (2013.01); *B32B 2307/558* (2013.01); *B32B 2571/00* (2013.01); *B32B 2605/00* (2013.01); *H01M 2220/20* (2013.01)

(56) References Cited

U.S. PATENT DOCUMENTS

| | | | |
|---|---|---|---|
| 2021/0066690 A1 | 3/2021 | Gondoh | |
| 2022/0223969 A1 | 7/2022 | Ben Salah | |
| 2022/0255184 A1 | 8/2022 | Czech et al. | |
| 2023/0253672 A1 | 8/2023 | Fronemann | |

FOREIGN PATENT DOCUMENTS

| | | | | |
|---|---|---|---|---|
| JP | 2014159219 A | * | 9/2014 | |
| WO | 2020239343 A1 | | 12/2020 | |

OTHER PUBLICATIONS

Swedish Search Report for Swedish Application No. 2350567-0, dated Nov. 16, 2023, 6 pages.

* cited by examiner

MOTOR VEHICLE

CROSS-REFERENCE TO RELATED APPLICATION

This application claims priority to German Patent Application No. 10 2022 112 694.3, filed May 20, 2022, the content of such application being incorporated by reference herein in its entirety.

FIELD OF THE INVENTION

The invention relates to a motor vehicle having an electric drive unit, an electrical energy reservoir, and a degassing device.

BACKGROUND OF THE INVENTION

In electrically driven motor vehicles with an electric drive unit and an electrical energy reservoir having battery cells, degassing devices in the region of the electrical energy reservoir are known so as to be able to selectively remove gases from the electrical energy reservoir that can form in a thermal event, for example in the event of an internal fault or in the event of damage to a battery cell of the electrical energy reservoir. The removal of hot gases from the electrical energy reservoir system is intended to prevent the hot gases in the electrical energy reservoir system from causing even greater damage, for example damage to further battery cells, so that a chain reaction of damaging further battery cells is thus prevented.

A degassing device from an electrical energy reservoir has become known, for example, from DE 10 2009 046 385 A1, which is incorporated by reference herein.

In motor vehicles with an electric drive unit, an electrical energy reservoir, and such a degassing device, there is the problem that the exiting hot gases can mix with air, and the hot gases could ignite due to the mixing of the hot gases with the oxygen of the air, so that other objects could also be set on fire.

Furthermore, it has been shown that particles can also be released from the battery cells, which can promote the ignition of the hot gases.

The invention addresses the problem of creating a motor vehicle having an electric drive unit, an electric energy reservoir, and a degassing device, in which the risk of ignition of gases exiting out of the electric energy reservoir is reduced.

SUMMARY OF THE INVENTION

One embodiment example of the invention relates to a motor vehicle having an electric drive unit, an electrical energy reservoir, and a degassing device, wherein the electrical energy reservoir comprises a housing having an internal space and having at least one battery cell arranged therein, wherein the degassing device comprises at least one degassing channel, which is fluidly connected to the internal space of the electrical energy reservoir and to the external environment, wherein the at least one degassing channel is formed by means of channel walls defining the path of the degassing channel, wherein the channel walls are configured such the degassing channel has a meandering path formed due to a plurality of channel deflections. Due to the design of the channel deflections of the at least one degassing channel, the at least one degassing channel is significantly extended within the degassing device compared to a straight path, so that the hot gases remain in the degassing channel longer and are cooled more strongly before exiting to the external environment, which greatly reduces the flammability of the hot gases. In addition, the channel deflections also present obstacles to exiting particles that can be stopped at the channel deflections and optionally also collected there, which also reduces the ignitability of the hot gases. All of this significantly reduces the risk of ignition of the gases exiting from the electrical energy reservoir.

According to one embodiment example, it is expedient for the degassing channel to have a meandering path. Thus, the degassing channel is significantly extended in length by a plurality of juxtaposed counter-rotating channel deflections in comparison to a straight channel design, so that the risk of ignition of hot gases is thereby significantly reduced.

It is particularly advantageous when the degassing channel or the respective degassing channel comprises a receiving pocket or a respective receiving pocket in the region of at least one channel deflection or on several channel deflections or on all channel deflections. Such a receiving pocket serves to ensure that particles entrained in the gas flow into the receiving pockets in the region of the channel deflection and are trapped there or adhered to the wall of the receiving pocket and are no longer entrained by the gas flow or can cool down on the wall of the receiving pocket and can no longer achieve an ignition of the gas. A receiving pocket can be configured as a recess of a wall of the channel deflection, for example as a gradation, which forms an obstacle in the direction of gas flow.

In a further embodiment example, it is also expedient when the electrical energy reservoir is configured as a floor-integrated electrical energy reservoir, for example a rechargeable battery, or is an underbody battery, wherein an underride protection plate is arranged below the electrical energy reservoir, which is adjacent to the electrical energy reservoir. The electrical energy reservoir system can thus be arranged in a space-saving manner and is also protected against impact from below by the underride protection plate.

It is particularly preferred when the degassing device is integrated into the underride protection plate with the at least one degassing channel. This means that the underride protection plate performs or comprises the formation of the degassing device with the at least one degassing channel. This can mean an integrated common configuration or additional fastening to the underride protection plate. This allows for a simple and inexpensive manufacturing and assembly.

It is particularly preferred when the underride protection plate forms or comprises the at least one degassing channel and the channel walls forming the at least one degassing channel. Thus, the design of the underride protection plate generates the formation of the degassing channels, which also allows for a simple manufacture and assembly.

It is particularly advantageous when the underride protection plate is configured as a single layer or multiple layers, wherein, in the single-layer or multi-layer underride protection plate, at least the uppermost layer facing the electrical energy reservoir forms or comprises the at least one degassing channel and the channel walls forming the at least one degassing channel. Thus, the upper layer can have the channel-forming properties, while the other layers can have other tasks. For example, the lower layer can primarily have strength tasks in order to be able to absorb forces from the bottom without damaging the electrical energy reservoir. Also, in case of a multi-layer plate, the adaptation of the different layers to meet various specifications can be achieved more easily than with a monolithic single-layer underride protection plate.

In a further embodiment example, it is also expedient when the underride protection plate is configured in three layers, wherein the two outer layers are configured so as to be substantially pressure-stable, and the middle layer between the two outer layers is configured as a compressible layer. As a result, the outer layers can take on stability tasks, while the middle layer can be utilized in order to model the surface and form elastic or impact-absorbing plastic properties.

It is also expedient when the two outer layers are formed from a plastic fiber composite and the middle layer is formed from a foam material. As a result, it is possible that, by compressing the layer arrangement, the channel-forming channel walls can be formed by locally pressing in the foam material, so that uncompressed regions can form high-standing channel walls. The depressions can then form the degassing channels.

It is also advantageous when the undercarriage protection plate is equipped with at least one sealing element in order to form the degassing channel and the channel walls forming the at least one degassing channel by means of the at least one sealing element.

BRIEF DESCRIPTION OF THE DRAWINGS

The invention is described in detail below on the basis of an embodiment example with reference to the drawings. The drawings show.

DETAILED DESCRIPTION OF THE INVENTION

Figure 1:
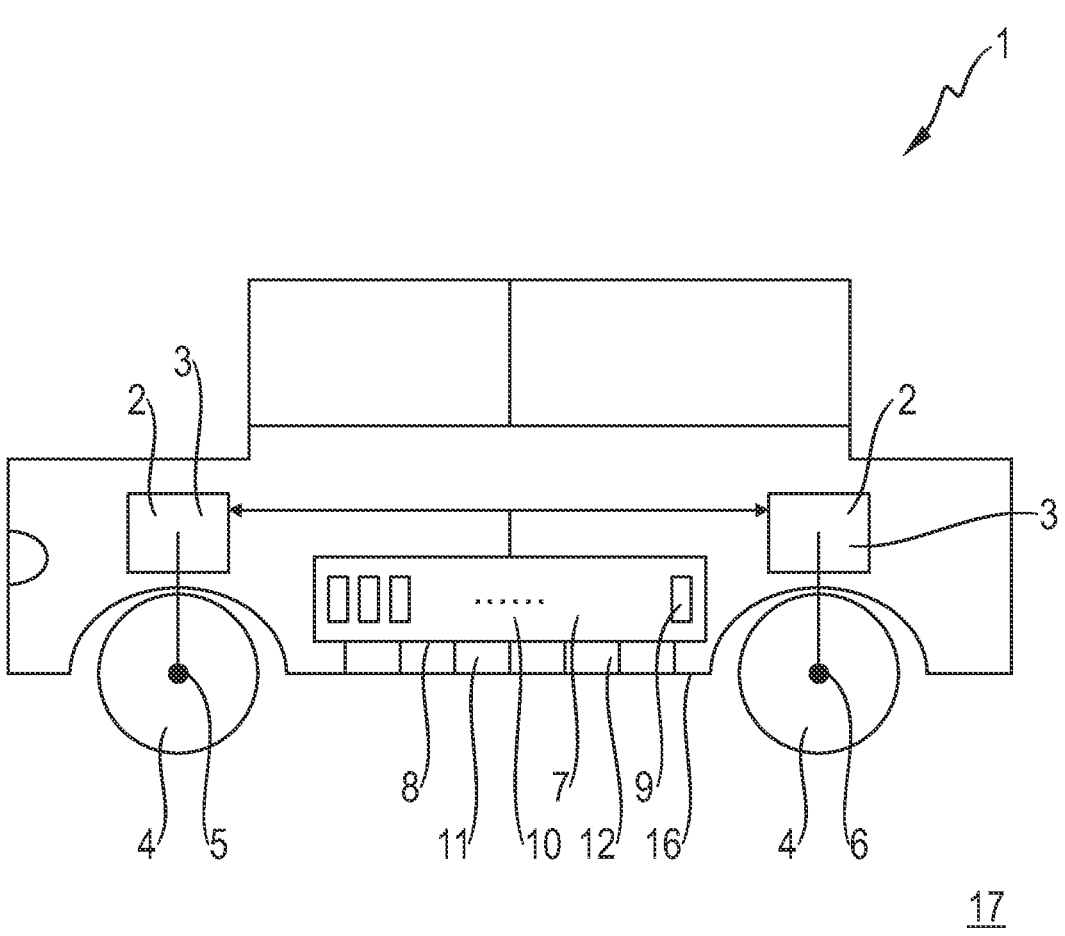
FIG. 1 is a schematic view of an embodiment example of a motor vehicle according to aspects of the invention.

FIG. 1 shows a schematic view of a motor vehicle 1 with an electric drive unit 2 for driving the motor vehicle 1. In this embodiment example, the drive unit 2 is configured with two electric motors 3, which drive the wheels 4 of the front axle 5 and the rear axle 6.

The motor vehicle 1 further comprises an electrical energy reservoir 7, such as a rechargeable battery, which is for example configured and arranged as an underbody battery. However, the electrical energy reservoir 7 can also be configured otherwise. The electrical energy reservoir 7 comprises, for example, a housing 8 with an internal space 10 with a number of battery cells 9 arranged therein, wherein the battery cells 9 are electrically connected to one another in order to achieve the desired output voltage.

Furthermore, a degassing device 11 is provided, which comprises at least one degassing channel 12 or a plurality of degassing channels 12. The respectively provided degassing channel 12 is fluidly connected on the one hand to the internal space 10 of the electrical energy reservoir 7 and on the other hand to the external environment 17. The respective degassing channel 12 is fluidly connected to a battery cell 9, for example.

The invention thus relates to an electrically or semi-electrically driven motor vehicle having at least one electrical energy reservoir device, such as a battery system.

Figure 2:
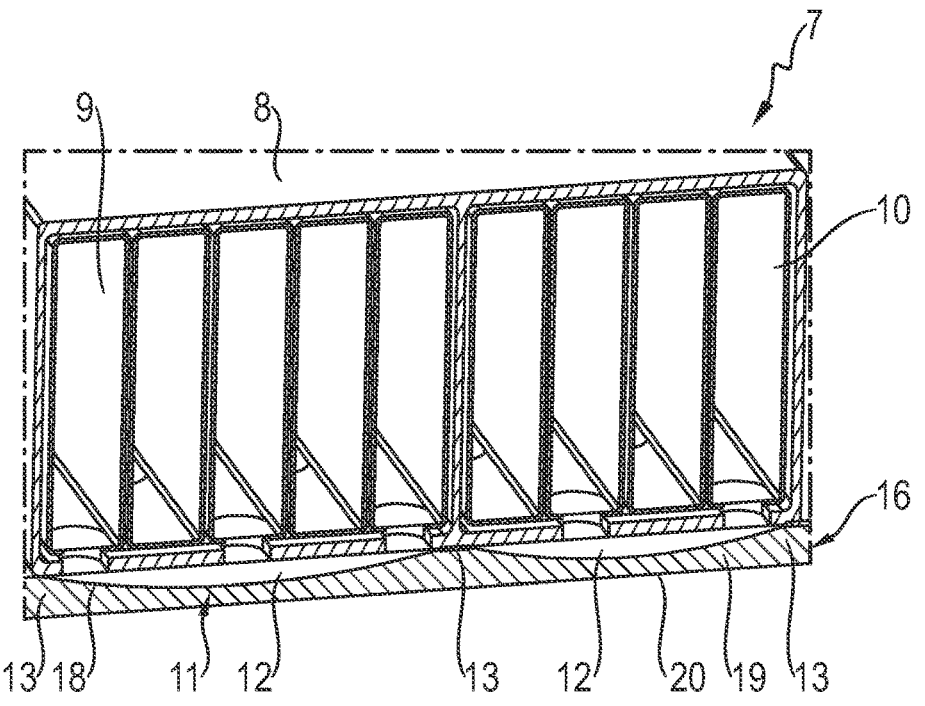
FIG. 2 is a cross-sectional view of a housing of an electrical energy reservoir with a degassing device with degassing channels.
Figure 3:
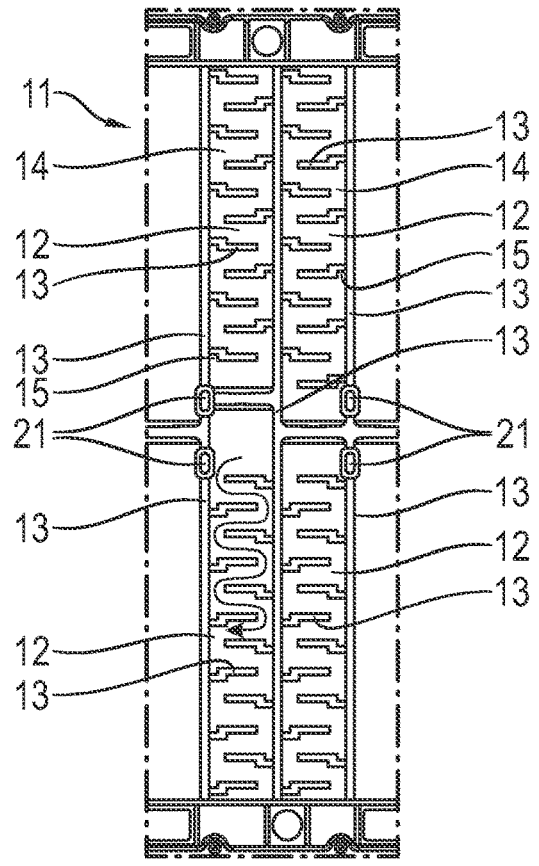
FIG. 3 is a view of a degassing channel according to aspects of the invention.

The at least one degassing channel 12 is configured by means of channel walls 13, see also FIGS. 2 and 3, which define the path of the degassing channel 12.

The channel walls 13 are configured such that the degassing channel 12 has a meandering path formed due to a plurality of channel deflections 14. As a result, it is achieved that the effective length of the degassing channel 12 for an outflowing gas is extended, which improves the cooling of the gas flowing out of the housing 8.

FIG. 3 shows that the degassing channel 12 has a meandering path. In FIG. 3, it can also be clearly seen that, in this embodiment example, several degassing channels 12 are arranged adjacent one another and/or that two degassing channels 12 each also extend from a central region in opposite directions.

According to an embodiment example according to aspects of the invention, it is also particularly preferred that the degassing channel 12 comprises a receiving pocket 15 in the region of at least one channel deflection 14. This respective receiving pocket 15 represents a type of recess in the channel wall 13 in the region of a channel deflection 14, which enables the particles transported with the flowing gas to be accumulated in the receiving pockets 15 and trapped therein and not transported further. Particles are thus filtered out of the gas flow.

This reduces the risk that such particles in the gas flow locally heat the gas flow strongly and ignite it, for example upon contact with atmospheric oxygen.

The degassing channel 12 preferably has a type of meandering shape with several directional changes for the gas flow, which are suitable for filtering particles out of the gas flow exiting the battery cells 9 by means of centrifugal forces occurring in the region of the direction change.

From FIG. 1 it can be seen by way of example that the electrical energy reservoir 7 is configured as a floor-integrated electrical energy reservoir 7 or is an underbody battery, wherein an underride protection plate 16 is arranged below the electrical energy reservoir 7, which is adjacent the electrical energy reservoir 7.

According to the embodiment example of FIG. 1, the degassing device 11 with the at least one degassing channel 12 is configured so as to be integrated into the underride protection plate 16. This means that the underride protection plate 16 forms or comprises the at least one degassing channel 12 and the channel walls 13 forming the at least one degassing channel 12.

The underride protection plate 16 arranged below the electrical energy reservoir 7 forms the at least one degassing channel 12 configured between the electrical energy reservoir 7 and the underride protection plate 16 with a connection to at least one degassing opening of the electrical energy reservoir 7.

According to an advantageous embodiment example, the underride protection plate 16 can be configured as a single layer or multiple layers, wherein, in the single-layer or multi-layer underride protection plate 16, at least the uppermost layer 18 facing the electrical energy reservoir 7 forms or comprises the at least one degassing channel 12 and the channel walls 13 forming the at least one degassing channel 12. In the example shown in FIG. 2, the underride protection plate 16 comprises three layers 18, 19, 20. The upper layer 18 faces and also contacts the electrical energy reservoir 7, for example.

The underride protection plate 16 can thus be configured in three layers, for example, wherein the two outer layers 18, 20 are configured so as to be substantially pressure-stable, and the middle layer 19 between the two outer layers 18, 20 is configured as a compressible layer.

The two outer layers 18, 20 can be formed from a plastic fiber composite material, and the middle layer 19 can be formed from a foam material.

In a preferred embodiment, elevations in the underride protection plate 16 can serve to seal and form the degassing channels 12 between the underride protection plate 16 and the electrical energy reservoir 7. For example, the structure of the underride protection plate 16 can be deformed by compressing the middle layer 19 as a foam layer with strong local force onto the underride protection plate from below, so that no local damage to the electrical energy reservoir 7 occurs due to the elevations.

Alternatively or additionally, the underride protection plate 16 can be equipped with at least one sealing element in order to form the degassing channel 12 and the channel walls 13 forming the at least one degassing channel 12 by means of the at least one sealing element.

In a preferred embodiment, between the underride protection plate 16 and the underside of the electrical energy reservoir 7, at least one seal or sealing element for forming the degassing channel 12, for example in meandering form, is attached. The seal or sealing element is preferably attached to the underride protection plate 16.

In a specific exemplary embodiment, the seal or sealing element is in the form of a foam or solid sealing lip.

In a preferred embodiment, the electrical energy reservoir 7 is arranged substantially level on its bottom side with the channel-forming side.

It is also preferred when the underride protection plate 16 is fastened to the electrical energy reservoir 7 at several laminarly distributed fastening points 21.

In a preferred embodiment, the shape, such as the meandering shape for example, of the underride protection plate 16 is configured by bulges of the upper protection plate layer 18.

In a preferred embodiment, at least a portion of the bulges serve to support the underride protection plate 16 at positions of the electrical energy reservoir 7 that are as stable as possible in the event of a mechanical stress on the vehicle underside.

LIST OF REFERENCE NUMBERS

1 Motor vehicle
2 Drive unit
3 Electric motor
4 Wheel
5 Front axle
6 Rear axle
7 Energy reservoir
8 Housing
9 Battery cell
10 Internal space
11 Degassing device
12 Degassing channel
13 Channel wall
14 Channel deflection
15 Receiving pocket
16 Underride protection plate
17 Outer environment
18 Layer
19 Layer
20 Layer
21 Fastening point

6

What is claimed is:

1. A motor vehicle comprising:
an electric drive unit;
an electrical energy reservoir comprising a housing having an internal space and at least one battery cell arranged therein; and
a degassing device comprising at least one degassing channel, which is fluidly connected to the internal space of the electrical energy reservoir and to the external environment,
wherein the at least one degassing channel is formed by channel walls defining a path of the degassing channel, wherein the channel walls are configured such the degassing channel has a meandering path formed due to a plurality of channel deflection openings,
wherein the channel walls comprise first and second boundary walls that at least partially delimit the degassing channel and first and second stepped walls extending into the degassing channel, wherein the first stepped wall extends perpendicularly from the first boundary wall and the second stepped wall extends perpendicularly from the second boundary wall,
wherein a receiving pocket having a rectangular shape is formed at an intersection of a step of the first stepped wall and the first boundary wall,
wherein the receiving pocket faces an inlet of the degassing channel,
wherein one of the deflection openings is disposed between a free end of said first stepped wall and the second boundary wall.

2. The motor vehicle according to claim 1, wherein the electrical energy reservoir is configured as either a floor-integrated electrical energy reservoir or an underbody battery, and the motor vehicle further comprises an underride protection plate arranged below the electrical energy reservoir.

3. The motor vehicle according to claim 2, wherein the degassing device is integrated into the underride protection plate.

4. The motor vehicle according to claim 3, wherein the underride protection plate forms or comprises the at least one degassing channel.

5. The motor vehicle according to claim 3, wherein the underride protection plate includes one or more layers, wherein, at least an uppermost layer of the underride protection plate faces the electrical energy reservoir and forms or comprises the at least one degassing channel.

6. The motor vehicle according to claim 5, wherein the underride protection plate includes three layers, wherein two outer layers of the three layers of the underride protection plate are substantially pressure-stable, and a middle layer of the three layers is locate between the two outer layers and is a compressible layer.

7. The motor vehicle according to claim 6, wherein the two outer layers are formed from a plastic fiber composite material and the middle layer is formed from a foam material.

8. The motor vehicle according to claim 3, wherein the underride protection plate is equipped with at least one sealing element in order to form the degassing channel, and wherein the channel walls form the at least one degassing channel by means of the sealing element.

9. The motor vehicle according to claim 2, wherein the first and second boundary walls and the first and second stepped walls are disposed on a top surface of the underride protection plate.

10. The motor vehicle according to claim 9, wherein the top surface of the underride protection plate is concave, and wherein the concave top surface forms a lower surface of the degassing channel.

11. The motor vehicle according to claim 1, wherein said one of the deflection openings is also disposed between the first and second stepped walls.

12. The motor vehicle according to claim 1, further comprising third and fourth boundary walls that are connected to the first and second boundary walls to form a bounded rectangular-shaped interior space, which interior space constitutes the degassing channel.

13. The motor vehicle according to claim 1, wherein a second receiving pocket having a rectangular shape is formed at an intersection of a step of the second stepped wall and the second boundary wall.

14. The motor vehicle according to claim 13, wherein the step of the receiving pocket and the step of the second receiving pocket both face in a same direction toward the inlet of the degassing channel.

15. The motor vehicle according to claim 1, wherein another one of the deflection openings is disposed between a free end of said second stepped wall and the first boundary wall.

16. The motor vehicle according to claim 1, wherein the first and second boundary walls are straight walls that are oriented parallel to one another.

17. The motor vehicle according to claim 1, wherein the step of the first stepped wall is fixed to the first boundary wall.

18. The motor vehicle according to claim 1, further comprising a third stepped wall that extends perpendicularly from the first boundary wall and is arranged in parallel to the first stepped wall.

19. The motor vehicle according to claim 18, wherein the steps of the first, second and third stepped walls all face in a same direction toward the inlet of the degassing channel.

* * * * *